(12) United States Patent
Seifert

(10) Patent No.: US 9,816,464 B2
(45) Date of Patent: Nov. 14, 2017

(54) THRUST VECTOR CONTROL

(71) Applicant: AIRBUS DEFENSE AND SPACE GMBH, Ottobrunn (DE)

(72) Inventor: Jost Seifert, Manching (DE)

(73) Assignee: AIRBUS DEFENSE AND SPACE GMBH, Ottobrunn (DE)

( * ) Notice: Subject to any disclaimer, the term of this patent is extended or adjusted under 35 U.S.C. 154(b) by 896 days.

(21) Appl. No.: 13/712,157

(22) Filed: Dec. 12, 2012

(65) Prior Publication Data

US 2013/0146675 A1    Jun. 13, 2013

(30) Foreign Application Priority Data

Dec. 13, 2011 (DE) .................. 10 2011 120 855

(51) Int. Cl.
*F02K 9/80* (2006.01)
*F02K 1/00* (2006.01)
*B64C 23/08* (2006.01)

(52) U.S. Cl.
CPC ............... *F02K 9/80* (2013.01); *B64C 23/08* (2013.01); *F02K 1/008* (2013.01)

(58) Field of Classification Search
CPC .......... F02K 1/002; F02K 1/004; F02K 1/006; F02K 1/008; F02K 9/80; F02K 9/805; F02K 9/84; F02K 9/90
See application file for complete search history.

(56) References Cited

U.S. PATENT DOCUMENTS

| 1,927,538 | A | * | 9/1933 | Zaparka | .................... | B63H 9/02 |
| | | | | | | 114/126 |
| 2,039,676 | A | * | 5/1936 | Zaparka | .................. | B64C 23/08 |
| | | | | | | 244/21 |
| 5,875,627 | A | | 3/1999 | Jeswine | | |
| 6,318,668 | B1 | * | 11/2001 | Ulanoski | ............. | B64C 29/0058 |
| | | | | | | 239/265.19 |
| 2010/0281874 | A1 | | 11/2010 | Rice | | |

\* cited by examiner

*Primary Examiner* — Andrew Nguyen
(74) *Attorney, Agent, or Firm* — Greenblum & Bernstein, P.L.C.

(57) ABSTRACT

Thrust vector control for a vehicle having a fluid drive, vehicle having thrust vector control and method of controlling thrust vector. Thrust vector control includes a thrust current region for a thrust current of a propulsion stream having a flow direction; a steering mechanism for the thrust current including at least one steering device arranged at least in a peripheral region of the thrust current region, and the at least one steering device includes a rotational body with a lateral surface and a rotational axis arranged transverse to the flow direction, and the rotational body being rotatable so that a first part of the lateral surface exposed to the thrust current rotates in a first rotational direction, whereby a Magnus effect is produced to deflect the thrust current. The first rotational direction is in a direction of the thrust current.

21 Claims, 8 Drawing Sheets

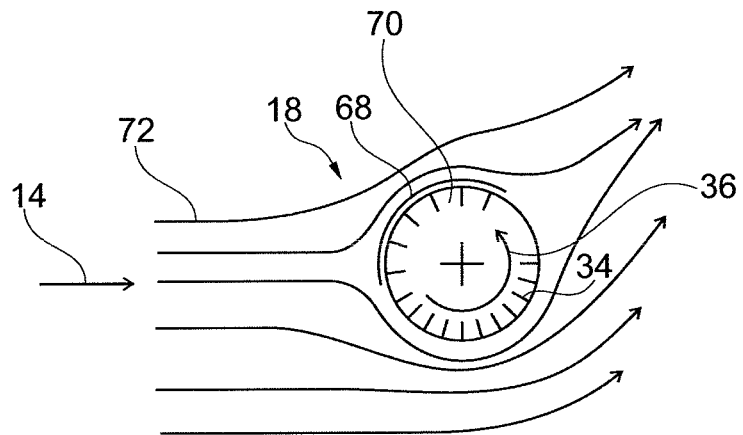
Fig. 6a
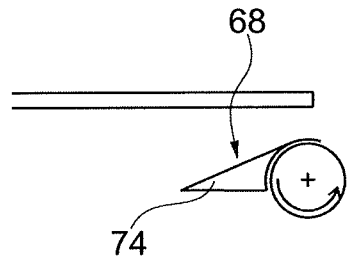
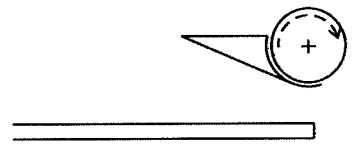
Fig. 6b
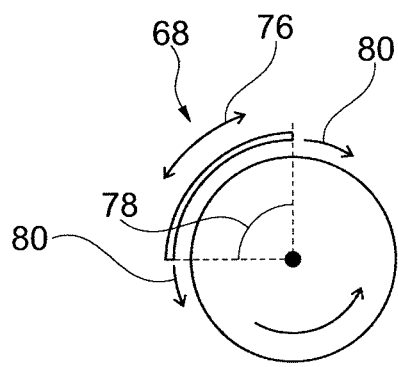
Fig. 6c

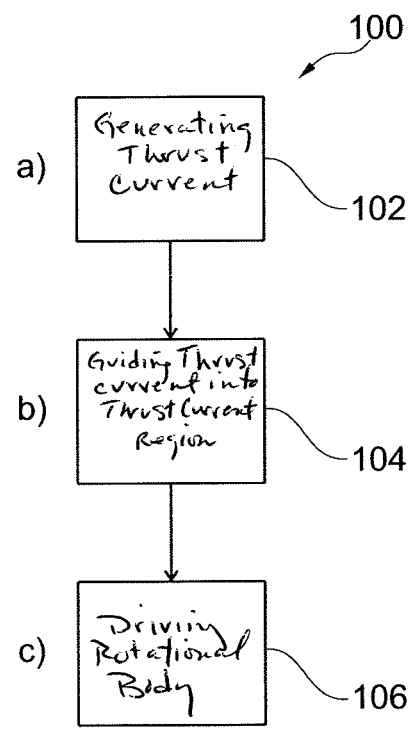
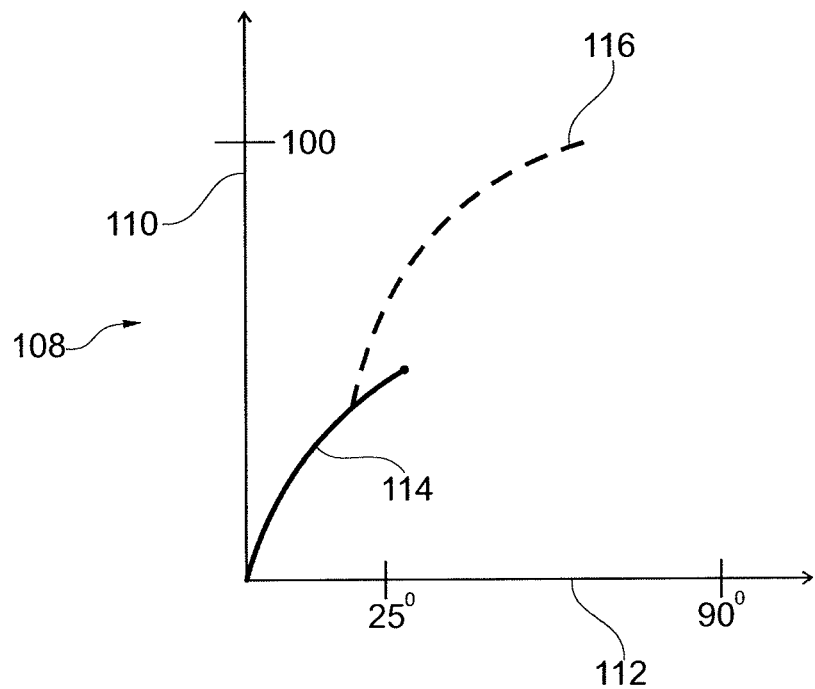
Fig. 10
Fig. 11

THRUST VECTOR CONTROL

CROSS-REFERENCE TO RELATED APPLICATIONS

The present application claims priority under 35 U.S.C. §119(a) of German Patent Application No. 10 2011 120 855.4 filed Dec. 13, 2011, the disclosure of which is expressly incorporated by reference herein in its entirety.

BACKGROUND OF THE INVENTION

1. Field of the Invention

The present invention relates to a thrust vector control for a vehicle having a fluid drive, a vehicle having a fluid drive, and a method for controlling a fluid-driven vehicle.

2. Discussion of Background Information

A thrust vector control is used, e.g., to control vehicles into a specific direction. For example, thrust vector controls are used for aircraft and also rockets. In addition, thrust vector controls are also used for watercraft and land vehicles, e.g., for jet-driven boats or also for so-called airboats, on which a propeller device generates a rearward airflow that can directed laterally by vertical flaps in order to control the airboat's direction. In the case of aircraft, for example, jet fighters, thrust vector controls, in addition to control flaps on the tail unit, are used to increase the controllability. In the case of rockets, a thrust vector control is also used, e.g., as a single controller device of controllability. The thrust vector control is, however, only effectively usable if a drive unit provides a corresponding thrust current. However, it has been shown that thrust nozzles, in particular, for use on aircraft, have only a relatively small clearance for movement, and thus provide a possible deflection of the thrust current in only a small angular segment. In addition, a deflection of the thrust current caused for example by control flaps generally results in a not insubstantial loss of thrust power due to the aerodynamic, or with regard to jet drives, hydrodynamic turbulences arising therefrom.

SUMMARY OF THE EMBODIMENTS

Embodiments of the present invention provide a thrust vector control which provides an improved controllability with the least possible loss of thrust power and simultaneously also provides controllability at low engine thrust.

Accordingly, embodiments are directed to a thrust vector control for a vehicle having a fluid drive, a vehicle having a fluid drive, and a method for controlling a fluid-driven vehicle.

According to a first aspect of the invention, a thrust vector control is provided for a vehicle having a fluid drive. The thrust vector control has a thrust current region for a thrust current of a propulsion stream which has a flow direction. In addition, the thrust vector control has a steering mechanism for the thrust current. The steering mechanism has at least one steering device, which is arranged at least in a peripheral region of the thrust current region. The at least one steering device has a rotational body driven by a drive, said body having a lateral surface and a rotational axis which is arranged transverse to the flow direction. A surface line of the rotational body, which line is exposed to the thrust current, runs in the direction of the peripheral region. A first part of the lateral surface is located at least in the peripheral region of the thrust current area and is exposed to the thrust current. The rotational body can be driven in such a manner that the first part of the lateral surface exposed to the thrust current rotates in a first rotational direction in the direction of the thrust current, wherein a Magnus effect can be generated thereby for deflecting the thrust current.

The rotational body can rotate at a circumferential speed that is, e.g., greater than the flow velocity of the thrust current region to which the lateral surface is exposed.

According to embodiments, the circumferential speed can be three to fourfold the flow velocity.

According to further embodiments, the circumferential speed may be lower than the flow velocity in order to effect a deflection.

The "surface line" runs transverse to the circumferential direction and transverse to the radius. The surface line can be a straight line or also a polygonal line or a crooked and/or a curved line. In other words, the rotational body can be a cylinder, a segment of a cone, or also a rotationally symmetrical body equipped with a different shape.

The expression "in the direction" includes a parallel alignment as well as an oblique, sloping or an alignment inclined toward each other, e.g., at an angle of up to 5°, at an angle up to 10°, at an angle up to 30°.

The expression "first part" relates to the region of the rotational body in the non-rotating state. Whenever the rotational body rotates, the "first part" does not move with it, but rather designates the respective section that in its position corresponds to the position of the "first part".

Due to the provision of a driven rotational body, e.g., a quickly rotating cylinder, a Magnus effect can be generated which laterally deflects the flow field, i.e., the thrust current. In other words, the Magnus effect, which arises due to the rotating cylinder, induces a control of the direction vector of the thrust current, i.e. a thrust vector control.

The thrust current region can be, e.g., at least partially limited by an outlet periphery which has an outlet opening for the thrust current of the propulsion stream.

According to an exemplary embodiment of the invention, the thrust current region may be at least partially limited by an outlet periphery which has an outlet opening for the thrust current of the propulsion stream. The steering mechanism can steer the thrust current exiting from the outlet opening. In addition, the at least one steering device can be arranged in a peripheral region of the outlet periphery, and a surface line of the rotational body, which can be exposed to the thrust current, may run in the direction of the peripheral region of the outlet periphery.

According to an exemplary embodiment of the invention, a thrust current generator can be provided which generates the thrust current.

For example, the thrust current generator may be a propeller or a turbine for generating an airflow or an exhaust-gas mixture stream. With regard to the thrust current generator, it can also be a jet drive, in which a water jet is generated by a pump device as a thrust current.

The steering mechanism can be arranged in such a manner that at least one part of the lateral surface is exposed at least to the edge of the thrust current.

The designation "at least one part of the lateral surface" also comprises the complete exposure of the lateral surface to the air current, which is also described later in connection with the guide plates in front of a part of the lateral surface.

According to an exemplary embodiment of the invention, the steering mechanism has a first steering device and a second steering device, which can be arranged at opposite first and second peripheral regions and can be driven independently of each other.

The steering mechanism can also have a third and fourth steering device, which are arranged on two opposite peripheral regions, which regions may be arranged between the first and second peripheral regions. In addition, a plurality of further steering devices can also naturally be provided, for example along a polygonally cut opening for the outlet of a thrust current to provide a circumferential control possibility or thrust vector control.

According to an exemplary embodiment of the invention, the steering mechanism may have at least one guide plate which is adjustable along a pivot axis, which axis is arranged transverse to the flow direction.

With regard to the guide plates, these are for example the previously used adjustment elements, which provide, as a supplement to the Magnus effect caused by the rotational body, an additional deflection, i.e., a further improved thrust vector control.

For example, two guide plates can be provided at opposite regions of the thrust current. In addition, a plurality of circumferentially arranged guide plates can also be provided around an outlet opening of the thrust current.

The guide plates can be provided next to the rotational body or rotational bodies, or, in relation to the flow of the thrust current, upstream or downstream of the rotational body or bodies.

According to an exemplary embodiment of the invention, the guide plate may be arranged at a distance to the rotational body in the thrust current region in the region of the rotational body.

The provision of a distance between one or more guide plates and one or more rotational bodies can guarantee that the thrust current is deflected over as much of the total cross-sectional area as possible corresponding to the desired control.

For example, the guide plate, or the guide plates, can be arranged in the outlet opening at a distance to the rotational body.

As a further example, a configuration is provided in which the thrust vector control has guide plates next to the rotational body or bodies: If these, i.e. the guide plates are set in the neutral position, i.e., in the direction of the thrust current of the propulsion stream without deflection, the rotating cylinders have little to no effect, i.e., there is little to no deflection. At a certain deflection of the guide plates, e.g. already at a small deviation from the neutral position, the effectiveness of the guide plates is proportionally increased by the Magnus effect up to the position in which the guide plates are almost in contact with the lateral surface.

According to an exemplary embodiment of the invention, one of the second parts of the rotational body, which is opposite a first part, may be provided with a shield which shields the second part from the thrust current. The second part may rotate counter to the direction of the thrust current during operation of the first rotational body in the first rotational direction.

In this manner, it is possible to also arrange the rotational body in the middle of the thrust current cross section, i.e., the rotational body can be flowed over on both sides by the thrust current. The shield on the one side can prevent the formation of unfavorable turbulences, while the free side, i.e., the first part, may affect the thrust current due to the Magnus effect in order to deflect the thrust current. By providing a shield, the rotational body can thus, in departure from the initially cited aspect, also be arranged in the middle in the thrust current. The expression "peripheral region" then relates to the region of the thrust current which lies on the unshielded side, i.e., the flow region which is so to speak guided past the shield is conceptually blocked out from being the feature of the peripheral region.

The shield can be adjustable in the position of its rotation angle. Alternatively or additionally, the shield can also be adjustable in its angular extension.

According to an exemplary embodiment of the invention, the rotational body is arranged inside the thrust current region at a distance to the peripheral region of the thrust current region.

For example, the rotational body is arranged at a distance to the outlet periphery.

A plurality of rotational bodies can also be provided adjacent to each other, or downstream from each other, or offset from each other in order to deflect the thrust current. In particular, different alignments of the rotational axes or different alignments of the effective surfaces of the respective rotational bodies can thereby also be provided in order to deflect the thrust current, e.g., two rotational bodies with one surface inclined toward the rotational axis, e.g., a truncated cone segments that are arranged at reversed inclinations to each other.

According to an exemplary embodiment of the invention, a fluid drive in the form of an engine may be provided for an aircraft, such that the thrust current is generated by the engine.

With regard to the engine, while it can be a turbine engine, it can also be a device in which an airflow is generated for the thrust current by a propeller.

The expression "aircraft" comprises e.g. manned and unmanned aircraft, spacecraft, as well as rockets. The expression aircraft also comprises air blowers.

The outlet opening can form a thrust nozzle, e.g., for a fighter jet.

According to an exemplary embodiment of the invention, a fluid drive in the form of a jet propulsion may be provided for a watercraft, such that the thrust current is generated by the water jet.

The expression "watercraft" can include, e.g., recreational motorboats, rescue motorboats, racing boats, and jet boats (known e.g. by the trade name Jet-Ski).

The inventive thrust vector control may additionally be provided for airboats and hovercraft, in which the drive is generated by an airflow and a deflection of the airflow effects a deflective motion of the vehicle, i.e., of the airboat or of a hovercraft.

According to a he second aspect of the invention, a vehicle can have a fluid drive and at least one thrust vector control according to one of the examples described above.

According to a third aspect of the invention, a method for controlling a fluid-driven vehicle is also provided having the following steps: a) Generation of a thrust current of a propulsion stream; b) Guiding of the thrust current in a thrust current region; and c) Driving at least one rotational body having a lateral surface and a rotational axis which is arranged transverse to the flow direction and which body is arranged in a peripheral region of the thrust current region. A surface line of the rotational body runs in the direction of the peripheral region and a part of the lateral surface is exposed to the thrust current. The rotational body is driven in such a way that the part of the lateral surface exposed to the thrust current is rotated in the direction of the thrust current and a Magnus effect is generated for deflecting the thrust current.

For example, in step b) the thrust current can be guided through an outlet opening which is formed by an outlet periphery. In step c) the rotational body may be arranged in a peripheral region of the outlet periphery.

According to a further aspect of the invention, a thrust vector control can be used for an aircraft having a fluid drive.

According to a further aspect of the invention, a rotating rotational body is introduced at a thrust current in order to achieve a deflection of the airflow or the thrust current by the Magnus effect. Due to the Magnus effect, there arise thereby only minimal output losses from the thrust of the thrust current. As the Magnus effect already occurs at low air speeds or fluid velocities, controllability already arises at low thrusts. An increased controllability can be provided at low engine thrust, e.g., during a landing approach or during failure of one or more engines, because a possible deflection is provided which is improved, in comparison to conventional control flaps, i.e., by extending over a greater angular region, by the Magnus effect. The inventive thrust vector control can be provided in different directions by the arrangement of corresponding rotational bodies, such that it is possible to forgo additional lateral flaps or pitch elevators in the case of aircraft and despite this be able to control different flight maneuvers such as the previously mentioned landing approach. The inventive thrust vector control can be used for an aircraft and also for stabilizing the aircraft, such that a conventional tail unit can be completely done away with.

Reference should be made to the fact that the features of the embodiments and aspects of the devices also apply for embodiments of the method as well as use of the device and vice versa. In addition, these same features can also be freely combined with each other in the case that this is not explicitly mentioned.

Embodiments of the instant invention are directed to a thrust vector control for a vehicle having a fluid drive. The thrust vector control includes a thrust current region for a thrust current of a propulsion stream having a flow direction; a steering mechanism for the thrust current including at least one steering device arranged at least in a peripheral region of the thrust current region, and the at least one steering device includes a rotational body with a lateral surface and a rotational axis arranged transverse to the flow direction, and the rotational body being rotatable so that a first part of the lateral surface exposed to the thrust current rotates in a first rotational direction, whereby a Magnus effect is produced to deflect the thrust current. The first rotational direction is in a direction of the thrust current.

According to embodiments, the at least one steering device has a drive coupled to rotatably drive the rotational body.

Further, a surface line of the rotational body exposed to the thrust current runs in the direction of the peripheral region, and the first part of the lateral surface is located at least in the peripheral region of the thrust current region and is exposed to the thrust current.

In accordance with other embodiments of the invention, the thrust vector control can include a shield structured and positionable to shield a second part of the lateral surface, which is generally opposite the first part, from the thrust current. The second part can rotate in a direction counter to the direction of the thrust current during operation of the first rotational body in the first rotational direction.

According to still other embodiments, the thrust vector control may include an outlet periphery that at least partially limits the thrust control region and that has an outlet opening for the thrust current. The steering mechanism can be structured and arranged to steer the thrust current exiting from the outlet opening, the at least one steering device may be arranged in a peripheral region of the outlet periphery; and a surface line of the rotational body can be exposed to the thrust current runs in a direction of the peripheral region of the outlet region. Further, the steering mechanism may also include a second steering device arranged in a second peripheral region of the outlet periphery, such that the peripheral region and the second peripheral region are arranged opposite each other. The steering device and second steering device may be drivable independently of each other.

In accordance with further embodiments, the thrust vector control may include a thrust current generator structured and arranged to generate the thrust current.

Moreover, the steering mechanism can further include at least one guide plate adjustable about a pivot axis that is arranged transverse to the flow direction. The guide plate can be arranged in the thrust current region and at a distance from the rotational body.

According to embodiments of the invention, the rotational body can be positionable inside the thrust current region and at a distance from the peripheral region of the thrust current region.

In embodiments, the thrust vector control can be structured and arranged in combination with a fluid drive of an aircraft engine, such that the aircraft engine generates the thrust current.

In further embodiments, the thrust vector control may be structured and arranged in combination with a fluid drive of a jet propulsion system for a watercraft, such that the water jet generates the thrust current.

According to further embodiments, a vehicle includes a fluid drive; and at least one thrust vector control as described above.

Embodiments of the invention are directed to a method for controlling a fluid-driven vehicle. The method includes generating a thrust current of a propulsion stream, guiding the thrust current in a thrust current region; and driving at least one rotational body that is arranged in a peripheral region of the thrust current region and that includes a lateral surface and a rotational axis arranged transverse to a flow direction of the propulsion stream. The rotational body is driven in such a manner that a Magnus effect is produced to deflect the thrust current.

According to embodiments, a surface line of the rotational body runs in a direction of the peripheral region and a part of the lateral surface may be exposed to the thrust current. Further, the rotational body can be rotatably driven so that the part of the lateral surface exposed to the thrust current is rotated in the direction of the thrust current.

In other embodiments, the method can include deflecting at least a part of the thrust current toward the steering device with a pivotable guide plate.

In accordance with still yet other embodiments of the present invention, the at least one at least one rotational body can include first and second rotational bodies arranged in first and second peripheral regions opposite one another, such that the thrust current is mainly guided between the first and second rotational bodies while contacting respective first and second the lateral surfaces of the first and second rotational bodies. The method can also include driving the first and second rotational bodies to rotate in opposite directions.

Embodiments of the instant invention are directed to a thrust vector control for a vehicle having a fluid drive emitting a thrust current. The thrust vector control includes at least one rotatable body arranged in at least an edge region of the thrust current so that a lateral surface of the at least one rotatable body is to be exposed to the thrust current, and at least one drive structured and arranged to rotatably drive the at least one rotatable body so that the lateral surface exposed to the thrust current is driven in a same direction as the thrust current.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1b illustrates a schematic perspective drawing of the thrust vector control from FIG. 1a;

FIGS. 6a-c illustrate further embodiments of an inventive thrust vector control;

FIG. 10 illustrates method steps for an exemplary method for controlling a fluid-driven vehicle according to the present invention; and FIG. 11 illustrates a chart with a comparison of lateral force and thrust angle for a conventional thrust vector control and a thrust vector control according to the present invention.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1A:
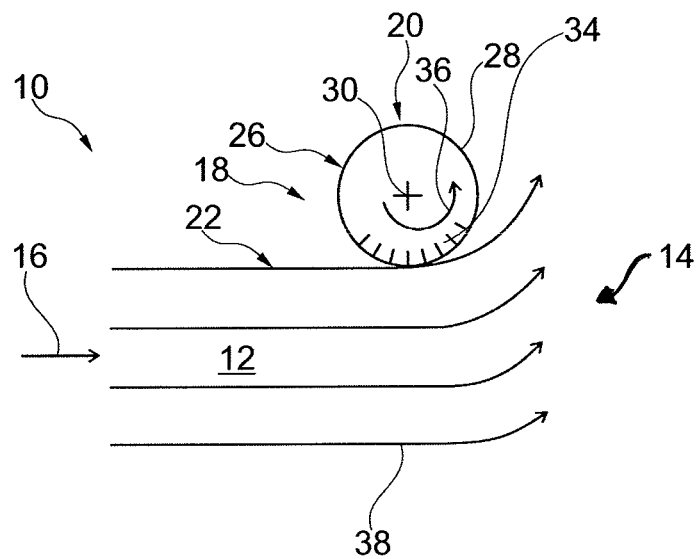
FIG. 1a illustrates a thrust vector control for a vehicle having a fluid drive according to an embodiment of the present invention in a longitudinal view in the direction of the thrust current.
Figure 1B:
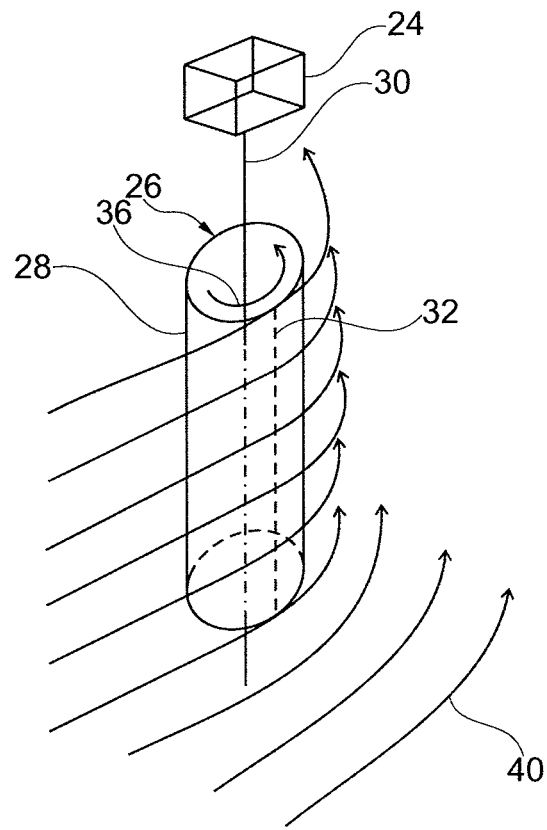

FIG. 1 shows a thrust vector control 10 for a vehicle having a fluid drive. Thrust vector control 10 has a thrust current region 12 for a thrust current 14 of a propulsion stream which has a flow direction 16 to propel the vehicle. Thrust vector control 10 additionally has a steering mechanism 18 for thrust current 14 that has at least one steering device 20 arranged at least in a peripheral region 22 of thrust current region 12. Steering device 20 has a rotational body 26 driven by a drive 24, which, while not shown in FIG. 1a, is schematically shown in FIG. 1b. (see FIG. 1b). Rotational body 26 has a lateral surface 28 and a rotational axis 30 arranged transverse to flow direction 16.

A surface line 32 (as a dashed line in FIG. 1b) of rotational body 26 is exposed to thrust current runs in the direction of peripheral region 22. A first part 34 of the lateral surface 28, which is indicated in FIG. 1a by hash marks, is located at least in the peripheral region 22 of the thrust current area 12 and is exposed to thrust current 14. In FIG. 1a it is noted that the hash marks of first part 34 appear in the illustration in the inner side of lateral surface 28, but not on the lateral surface itself. However, it should be understood that the hash marks designate the outer part of the lateral surface 28, and more particularly, the hash marks designate the segment of lateral surface 28 that is exposed to thrust current 14, which does not move with rotation of the rotational body 26.

Rotational body 26 can be driven in such a manner that first part 34 of lateral surface 28 exposed to thrust current 14 rotates in a first rotational direction 36 in the direction of thrust current 14. In this manner, a Magnus effect can be generated for deflecting thrust current 14.

Thrust current 14 in FIG. 1a is represented by a series of arrows 38, and in FIG. 1b by a series of arrows 40. Arrows 38, 40, which are provided for better understanding of the embodiments, are not intended to indicated that individually identifiable airflow directions are present in this region, but rather that an airflow in its entirety is represented by thrust current 14. Further, while a circumferential speed can be, e.g., three to fourfold the flow velocity, the circumferential speed can also be lower than the flow velocity.

Due to the rotating rotational body 26, a Magnus effect arises at rotational body 26 that causes a deflection of thrust current 14, i.e., upwards in FIG. 1a, as indicated by the corresponding deformation of arrow configurations 38 or 40 in FIGS. 1a and 1b.

Figure 2:
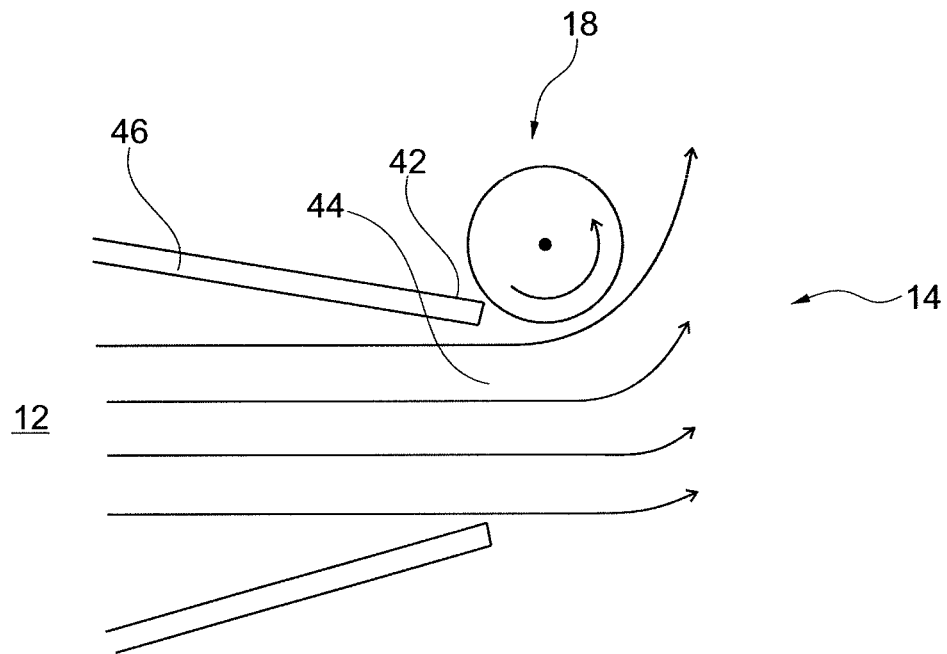
FIG. 2 illustrates a further embodiment of a thrust vector control according to the present invention.

According to the embodiment shown in FIG. 2, thrust current region 12 is at least partially limited by an outlet periphery 42 which has an outlet opening 44 for thrust current 14 of the propulsion stream. Outlet periphery 42 can be provided by a lateral mounting, e.g., a circumferential wall 46. Steering mechanism 18 steers thrust current 14 exiting from outlet opening 44. The at least one steering mechanism 18 is thereby arranged in a peripheral region of outlet periphery 42, and a surface line of the rotational body, which is exposed to thrust current 14, runs in the direction of the peripheral region of outlet periphery 42.

Figure 3:
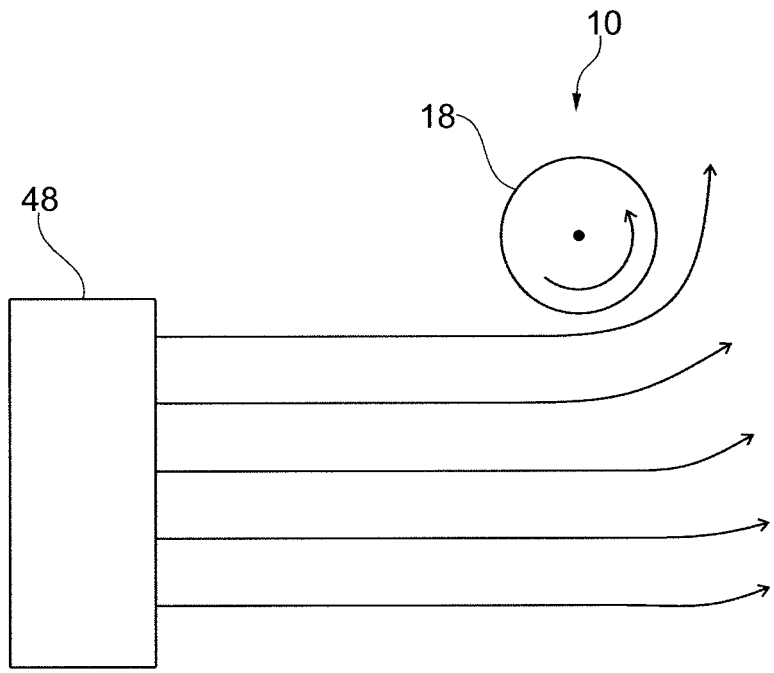
FIG. 3 illustrates a further embodiment of a thrust vector control according to the present invention.

According to the embodiment shown in FIG. 3, a thrust current generator 48 is provided which generates the thrust current. By way of non-limiting example, a propeller device can be provided to generate the thrust current, or also a turbine or an engine. With regard to thrust current generator 48, it can also be a jet drive for a watercraft. Thrust vector control 10 also affects, in this case via steering mechanism 18, a deflection of the thrust current, as is indicated by the corresponding arrow configuration.

It is understood that thrust current generator 48 from FIG. 3 can also be combined with other features from the remaining Figures without departing from the spirit and scope of the embodiments of the invention.

Figure 4:
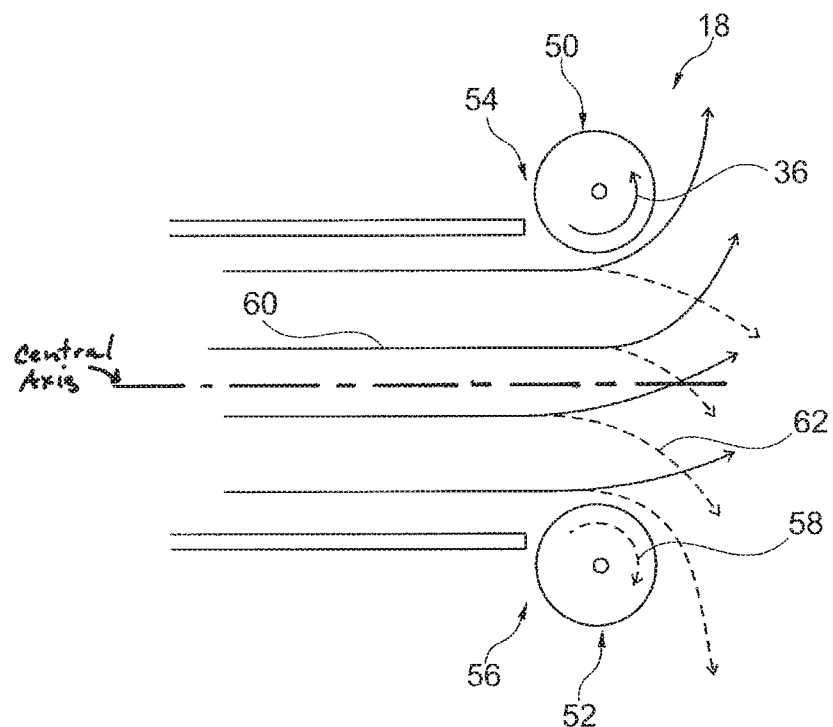
FIG. 4 illustrates depicts a further embodiment for a thrust vector control according to the present invention.

According to the embodiment shown in FIG. 4, steering mechanism 18 has a first steering device 50 and a second steering device 52 which are arranged at opposite first and second peripheral regions 54, 56 and which can be driven independently of each other. For example, first steering device 50, or its corresponding rotational body, can be rotated in a first direction 36, and the second steering device 52, or its corresponding rotational body, can be rotated in a second direction 58 (represented by a dashed rotation arrow).

The rotation in first rotational direction 36 effects a corresponding deflection of the airflow, which is represented by an arrow configuration 60 having solid lines. The rotation in the second rotational direction 58 effects a corresponding deflection of the airflow, represented by an arrow configuration 62 having dashed lines, which is contrast to arrow configuration 60.

The rotation of the two rotational bodies of first and second steering device 50, 52 can occur at different times, i.e., to be offset from each other, as well as naturally also simultaneously, in case a corresponding turbulence due to the oppositely deflected thrust currents is desired.

According to a further embodiment (not shown), a third and a fourth, and/or even further steering devices can be provided, which may be arranged at the corresponding peripheral regions.

Figure 5:
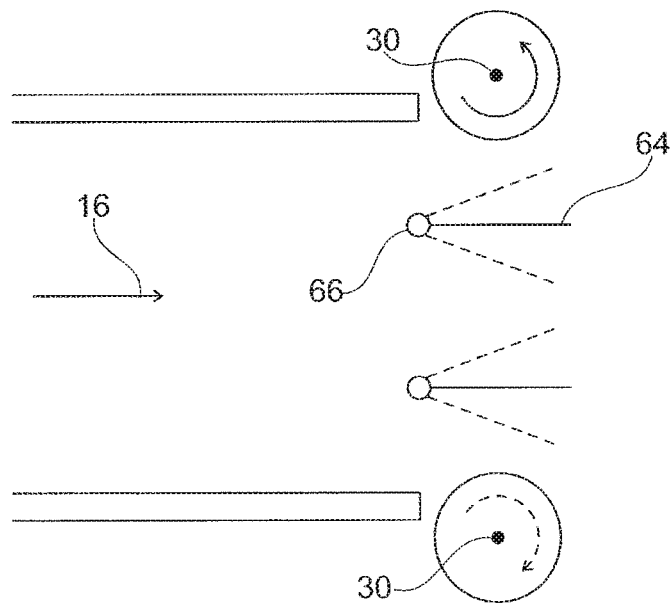
FIG. 5 illustrates depicts a further embodiment for a thrust vector control according to the present invention.

According to the embodiment shown in FIG. 5, the steering mechanism has at least one guide plate 64 that is adjustable about a pivot axis 66 that is arranged transverse to flow direction 16. Moreover, the at least one guide plate 64 can be arranged to pivot about pivot axis 66, which is arranged parallel to rotational axis 30 of at least one rotational body. By way of further non-limiting example, it is further contemplated that one or more guide plates 64 can be arranged so that each guide plate 64 has a pivot axis 66 transverse to flow direction 16 and perpendicular or transverse to rotational axes 30 (not shown)

For example, the guide plate or plates can be arranged in the thrust current region at a distance from the rotational body, as is shown in FIG. 5.

According to the embodiments shown in FIGS. 6a-6c, a second part 70 of the rotational body can be arranged opposite first part 34 and can be provided with a shield 68 to shields second part 70 from thrust current 14. This can be advantageous in that second part 70 rotates counter to the direction of thrust current 14 during operation of the rotational body in the rotational direction 36.

In FIG. 6a, the first part 34 designated the hash marks, as described above in FIG. 1a, and second part 70 is likewise designated by second hash marks. Analogously to the hash marks of first part 34 in FIG. 1a, the hash marks of second part 70 indicate the lateral surface or a part of the lateral surface and not the region within the rotational body.

Further, as shown in FIG. 6a, arrow configuration 72 represents the airflow of thrust current 14 that flows around the rotational body, which flows on both sides of steering device 18. The Magnus effect occurs due to the rotation of the rotational body and subsequently, as is shown in FIG. 6a, so that a deflection of thrust current 14 is directed around the rotational body, i.e., obliquely upward toward the right in FIG. 6a. While not shown for reasons of clarity and ease of explanation, it is understood that peripheral regions, guide plates and/or other previously described structured can be utilized in combination with the embodiment of FIG. 6a without departing from the spirit and scope of the embodiments.

FIG. 6b illustrates a further embodiment of shield 68 that can include an aerodynamic profile 74 in order to present the lowest possible air resistance for the flow of thrust current 14 flowing past in the region of shield 68. While not shown in FIG. 6b, the flow of thrust current 14 in relation to the rotational bodies and shield is understood.

FIG. 6c shows an embodiment of shield 68, in which the shield can be adjustable in the position of its rotation angle, as indicated by double arrow 76. Shield 68 can also be adjustable in its angular extension, so that the angle 78 between the ends of shield 68 in relation to the rotational axis of the rotational body can be adjusted by extending the ends as shown by the arrows 80. Again, while not shown for reasons of clarity and ease of explanation, it is understood that peripheral regions, guide plates and/or other previously described structured can be utilized in combination with the embodiment of FIG. 6c without departing from the spirit and scope of the embodiments.

According to a further embodiment, the rotational body is arranged inside of the thrust current region at a distance to the peripheral region of the thrust current region, as is shown e.g. in FIG. 6b in combination with the shield; however, this can also be provided without the shield.

According to a further embodiment, a thrust vector control can be part of a fluid drive in an engine for an aircraft. In this regard, the thrust current may be generated by the engine.

Figure 7:
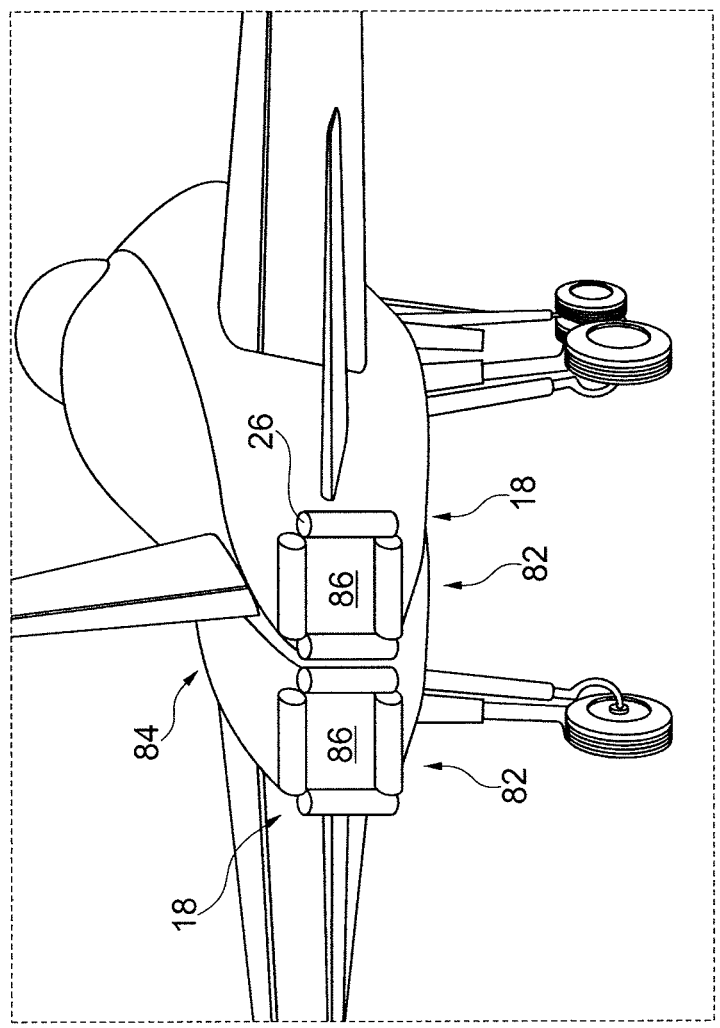
FIG. 7 illustrates an embodiment of an aircraft having a thrust vector control according to the present invention.

FIG. 7 shows an exemplary embodiment in which a vehicle 84, in particular, an aircraft and more particularly, a fighter jet, includes two engines 82 having rear outlet openings 86 through which thrust currents exit. A plurality of steering devices 18, in which each steering device 18 can include at least one and preferably four rotational bodies 26, may be arranged adjacent, e.g., circumferentially around, outlet openings 86, in order to effect a deflection of the thrust current in manner extensively presented above. Naturally, further guide plates, peripheral regions, and/or structural elements can also additionally be provided, which are, however, not shown in more detail for the sake of clarity and ease of explanation.

According to a further embodiment (not shown in more detail), an aircraft can have, instead of a turbine engine, a propeller drive as the engine in order to generate the thrust current.

According to still another (albeit not illustrated) embodiment, a rocket having a rocket propulsion system can utilize the thrust vector control in accordance with the above-description having one or more rotational bodies (however, this is not depicted in more detail).

Figure 8:
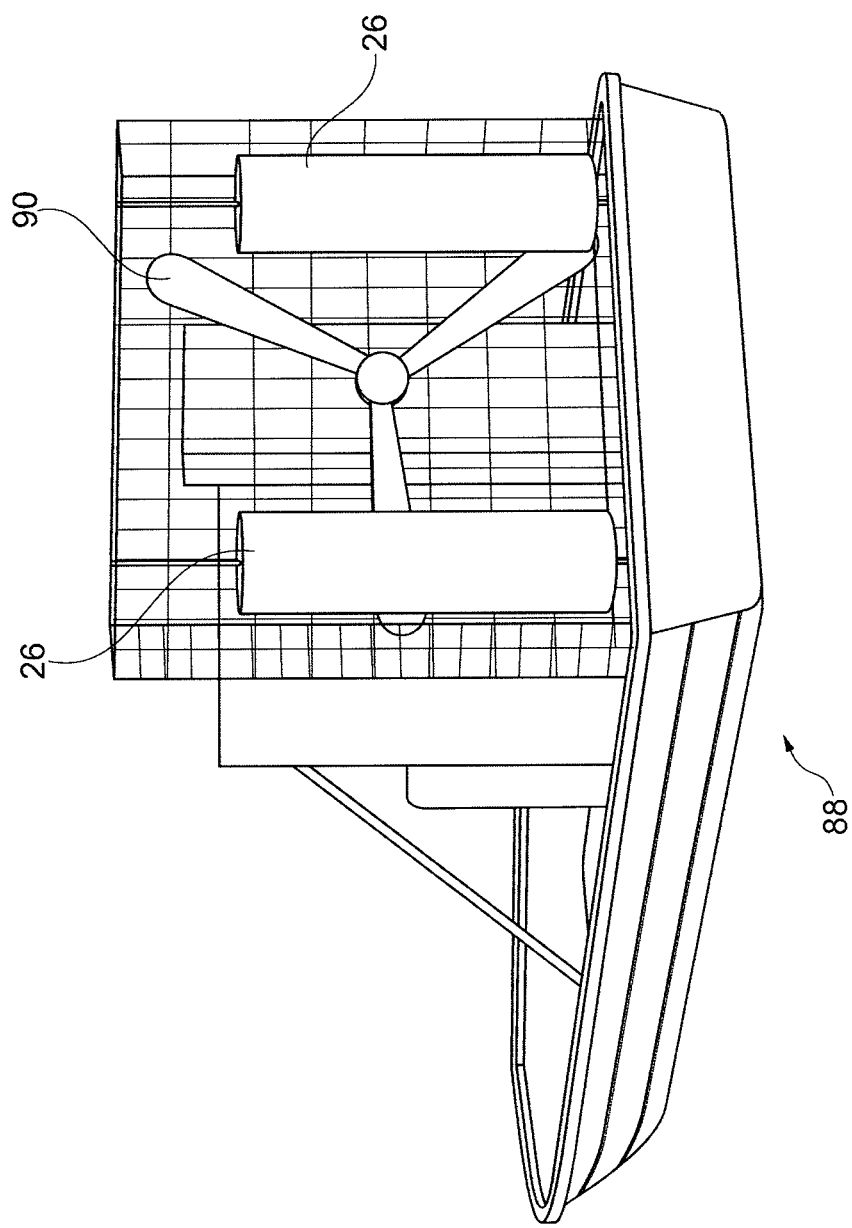
FIG. 8 illustrates an embodiment for an airboat having a thrust vector control according to the present invention.

FIG. 8 illustrates a so-called airboat, for which a propeller drive 90 generates the propulsion. Two rotational bodies 26 located opposite each other are provided at the side of the propeller drive 90 in order to deflect the airflow generated by the propeller drive 90 in order to enable maneuvering the boat to one side or the other.

Figure 9:
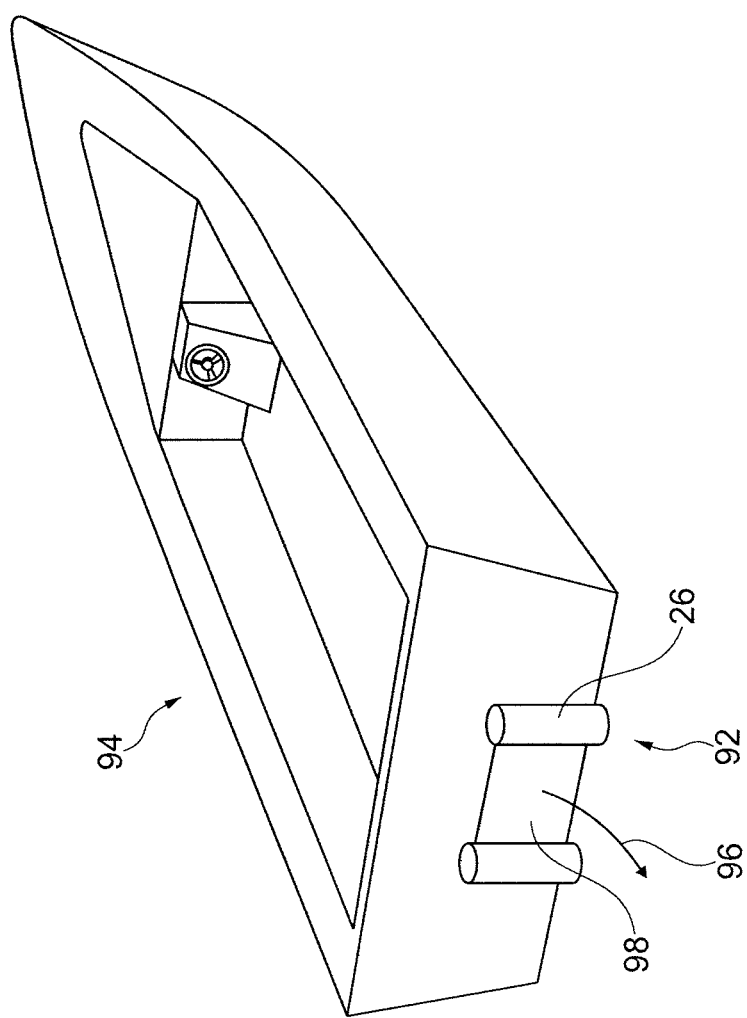
FIG. 9 illustrates an embodiment for a watercraft having a jet propulsion and a thrust vector control according to the present invention.

FIG. 9 shows a jet propulsion engine 92 positionable as a fluid drive for a watercraft 94, e.g., a motor boat. Thrust current in the form of a water jet 96 exits jet propulsion engine 92 through an outlet opening 98. Two rotational bodies 26 can be located opposite each other at the sides of outlet opening 98 in order to deflect water jet 96 and thereby enhance control of motor boat 94.

According to embodiments of the present invention, a vehicle, e.g., aircraft 84 of FIG. 7, airboat 88 of FIG. 8, or motor boat 94 of FIG. 9, can include a fluid drive and at least one thrust vector control 10 in accordance with the above-described embodiments.

It is to be understood that features and structures described in the individual figures can be combined with each other in embodiments not illustrated in the attached drawings without departing from the spirit and scope of the embodiments of the invention. By way of non-limiting example, thrust current generator 48 can be used in combination with steering devices 18 located opposite each other, as depicted in FIG. 4, with guide plates 64, as depicted in FIG. 5, and/or with shields 68 as depicted in FIGS. 6*a*-6*c*.

According to a further (albeit not illustrated) embodiment apparent from the foregoing disclosure, the thrust vector control can include guide plates arranged next to the rotational bodies cylinders. In this regard, while the guide plates are in a neutral position, the rotating cylinders have little or no effect. However, with a certain deflection of the guide plates, the effectiveness of the guide plates is proportionally increased by the Magnus effect until the guide plates virtually abut the lateral surface of the rotational body. In this manner, the rotational bodies can be, e.g., raised in preparation for a landing, i.e., offset in rotation. This raising can take, e.g., a few seconds to complete.

FIG. 10 shows a method 100 for controlling a fluid-driven vehicle. In step 102, a thrust current of a propulsion stream can be generated. In step 104, the thrust current may be guided into a thrust current region. Finally, in step 106, at least one rotational body is driven. As described above, the at least one rotational body includes a lateral surface and a rotational axis arranged transverse to the flow direction. Further, the rotational body can be arranged in a peripheral region of the thrust current region, so that a surface line of the rotational body runs in the direction of a peripheral region and a part of the lateral surface is exposed to the thrust current. The rotational body is driven in such a manner that the part of the lateral surface exposed to the thrust current is rotated in the direction of the thrust current, whereby a Magnus effect is generated to deflect the thrust current.

In FIG. 10, step 102 is also designated as a), step 104 as b), and step 106 as c). Steps a) to c) can be implemented simultaneously, or the control of the fluid-driven vehicle may presuppose the generation and guiding of the thrust current according to steps a) and b). Control by the thrust vector control occurs only due to the actuation of the rotational body in step c). Steps a) and b) can consequently also be provided independent of step c), e.g., for an actuation of the vehicle, without initiating a control, since the thrust vector control is only provided by step c).

FIG. 11 shows a chart 108, in which the lateral force is shown as a percent of the total thrust $F_{total}$ on the vertical axis 110 and the thrust angle is shown in degrees on a horizontal axis 112. The first curve segment 114 shows a conventional thrust vector control, for example for an aircraft, in which e.g. due to design there is only clearance for movement of maximum +/−25°. A second curve segment 116 represents the corresponding thrust angle in conjunction with the lateral force generated via embodiments of the present invention.

As is obvious from the representations above in conjunction with FIG. 11, an increased controllability is provided by the embodiments of present invention due to an increased thrust angle region and an improved lateral force.

The embodiments described above can be combined in different ways without departing from the spirit and scope of the invention. In particular, aspects of the method can also be used for embodiments of the device as well as uses of the devices and vice versa. Accordingly, it is understood that, even if an express indication of combination is not provided, features or steps described with reference to one or more of the above embodiments can be used in combination with any other features or steps of embodiments.

It is noted that the foregoing examples have been provided merely for the purpose of explanation and are in no way to be construed as limiting of the present invention.

While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A thrust vector control for a vehicle having a fluid drive, comprising:
    a thrust current region for a thrust current of a propulsion stream having a flow direction, the thrust current region being limited by an outlet periphery formed by a circumferential wall; and
    a steering mechanism for the thrust current of the propulsion stream comprising at least one steering device that comprises a rotational body with a lateral surface and a rotational axis, the rotational body being arranged at least in a region of the outlet periphery so that the rotational axis is arranged transverse to the flow direction; and
    the rotational body being arranged in the region of the outlet periphery so that a first segment of the lateral surface is exposed to the thrust current of the propulsion stream and a second segment of the lateral surface, which is generally opposite the first segment, is not exposed to the thrust current of the propulsion stream, and the first segment of the rotational body exposed to the thrust current of the propulsion stream rotates in a first rotational direction, whereby a Magnus effect is produced to deflect the thrust current of the propulsion stream, and
    wherein the first rotational direction is in the flow direction of the thrust current of the propulsion stream, and wherein
    the thrust current region has a central axis in the flow direction and the first segment of the lateral surface extends a smaller radial distance from the central axis than a radially inner surface of the circumferential wall and the second segment of the lateral surface extends a larger radial distance from the central axis than a radially outer surface of the circumferential wall.

2. The thrust vector control according to claim 1, wherein the at least one steering device has a drive coupled to rotatably drive the rotational body.

3. The thrust vector control according to claim 1, wherein a surface line of the rotational body exposed to the thrust current of the propulsion stream runs in the direction of the region of the outlet periphery, and the first segment of the lateral surface is located at least in the region of the outlet periphery of the thrust current region and is exposed to the thrust current.

4. The thrust vector control according to claim 1, wherein the outlet periphery has an outlet opening for the thrust current;
    wherein the steering mechanism is structured and arranged to steer the thrust current exiting from the outlet opening; and a surface line of the rotational body exposed to the thrust current of the propulsion stream runs in a direction of the region of the outlet periphery.

5. The thrust vector control according to claim 4, wherein the at least one steering device comprises a first steering device arranged in a first region of the outlet periphery and a second steering device arranged in a second region of the outlet periphery, such that the first region and the second region are arranged opposite each other, and
wherein the first steering device and second steering device are drivable independently of each other.

6. The thrust vector control according to claim 1, further comprising a thrust current generator structured and arranged to generate the thrust current of the propulsion stream.

7. The thrust vector control according to claim 1, wherein the steering mechanism further comprises at least one guide plate adjustable about a pivot axis that is arranged transverse to the flow direction.

8. The thrust vector control according to claim 7, wherein the guide plate is arranged in the thrust current region and at a distance from the rotational body.

9. The thrust vector control according to claim 1, further comprising a second rotational body is positionable inside the thrust current region.

10. The thrust vector control according to claim 1 structured and arranged in combination with a fluid drive of an aircraft engine,
wherein the aircraft engine generates the thrust current of the propulsion stream.

11. The thrust vector control according to claim 1 structured and arranged in combination with a fluid drive of a jet propulsion system for a watercraft, wherein a water jet generates the thrust current of the propulsion stream.

12. A vehicle comprising:
a fluid drive; and
at least one thrust vector control according to claim 1.

13. A method for controlling a fluid-driven vehicle, comprising:
generating a thrust current of a propulsion stream;
guiding the thrust current of the propulsion stream in a thrust current region that is limited by an outlet periphery formed by a circumferential wall; and
driving at least one rotational body that includes a lateral surface and a rotational axis and that is arranged in a region of the outlet periphery so that the rotational axis is arranged transverse to a flow direction of the propulsion stream, the at least one rotational body being arranged so that a first segment of the lateral surface is exposed to the thrust current of the propulsion stream and a second segment of the lateral surface, which is generally opposite the first segment, is not exposed to the thrust current of the propulsion stream,
wherein the at least one rotational body is driven in such a manner that a Magnus effect is produced to deflect the thrust current of the propulsion stream, and
wherein the thrust current region has a central axis in the flow direction and the first segment of the lateral surface extends a smaller radial distance from the central axis than a radially inner surface of the circumferential wall and the second segment of the lateral surface extends a larger radial distance from the central axis than a radially outer surface of the circumferential wall.

14. The method according to claim 13, wherein a surface line of the at least one rotational body runs in a direction of the region of the outlet periphery.

15. The method according to claim 14, wherein the at least one rotational body is rotatably driven so that the first segment of the lateral surface exposed to the thrust current is rotated in the direction of the thrust current of the propulsion stream.

16. The method according to claim 13, further comprising:
deflecting at least a part of the thrust current of the propulsion stream toward the steering device with a pivotable guide plate.

17. The method according to claim 13, wherein the outlet periphery comprises first and second peripheral regions generally opposite one another and the at least one rotational body comprises first and second rotational bodies arranged in the first and second peripheral regions, whereby an arrangement of the first and second rotational bodies in relation to the first and second peripheral regions allow the thrust current of the propulsion stream guided through the outlet periphery to contact respective first lateral surfaces of the first and second rotational bodies that are arranged within the outlet periphery, while preventing the thrust current of the propulsion stream guided through the outlet periphery from contacting respective second lateral surfaces of the first and second rotational bodies arranged outside of the outlet periphery.

18. The method according to claim 17, further comprising driving the first and second rotational bodies to rotate in opposite directions.

19. A thrust vector control for a vehicle having a fluid drive emitting a thrust current, comprising:
an outlet periphery formed by a circumferential wall limiting a thrust current of the fluid drive;
at least one rotatable body arranged in at least a region of the outlet periphery so that a first segment of a lateral surface of the at least one rotatable body is exposed to the thrust current of the fluid drive and a second segment of the lateral surface, which is generally opposite the first segment, is not exposed to the thrust current of the fluid drive; and
at least one drive structured and arranged to rotatably drive the at least one rotatable body so that the first segment of the lateral surface exposed to the thrust current is driven in a same direction as the thrust current of the fluid drive,
wherein the at least one rotatable body is driven to produce a Magnus effect to deflect the thrust current of the fluid drive, and wherein the outlet periphery has a central axis in a flow direction of the thrust current through the fluid drive and the first segment of the lateral surface extends a smaller radial distance from the central axis than a radially inner surface of the circumferential wall and the second segment of the lateral surface extends a larger radial distance from the central axis than a radially outer surface of the circumferential wall.

20. The thrust vector control according to claim 1, further comprising a duct defining the outlet periphery and through which the thrust current of the propulsion stream exits,
wherein the rotational body is arranged so that the circumferential wall comprising a peripheral wall of the duct prevents the second segment of the lateral surface from being exposed to the thrust current of the propulsion stream.

21. The thrust vector control according to claim 19, further comprising a duct defining the outlet periphery and through which the thrust current of the fluid drive exits,
wherein the at least one rotatable body is arranged so that the circumferential wall comprising a peripheral wall of the duct prevents the second segment of the lateral surface from being exposed to the thrust current of the fluid drive.

* * * * *